Sept. 30, 1958     C. B. CEASE ET AL     2,853,962
PLANT HOLDER
Filed Oct. 31, 1955     2 Sheets-Sheet 1
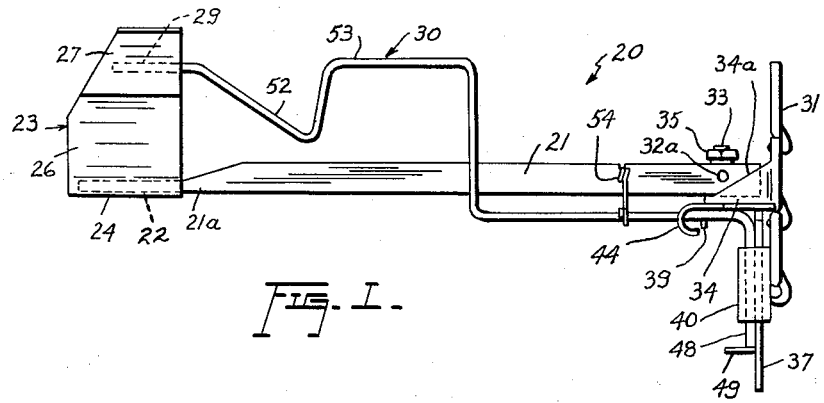
FIG. 1.
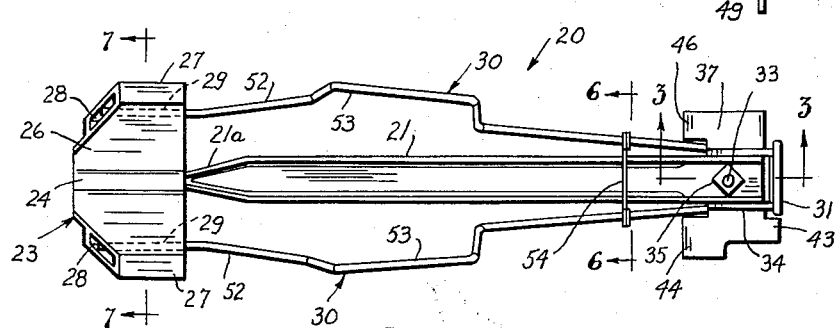
FIG. 2.
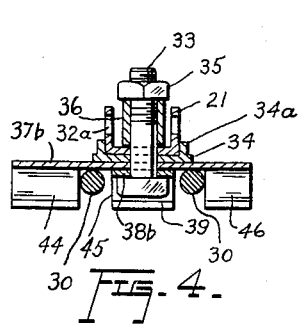
FIG. 4.
FIG. 6.
FIG. 5.
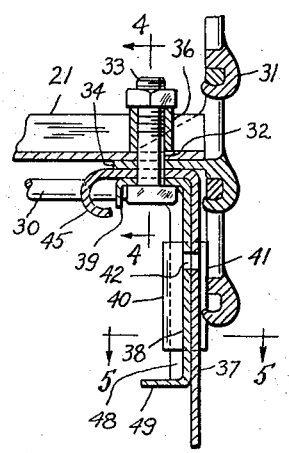
FIG. 3.
INVENTORS
Carl B. Cease
John W. Glover
George C. Wood
BY *Munson H. Lane*
ATTORNEY

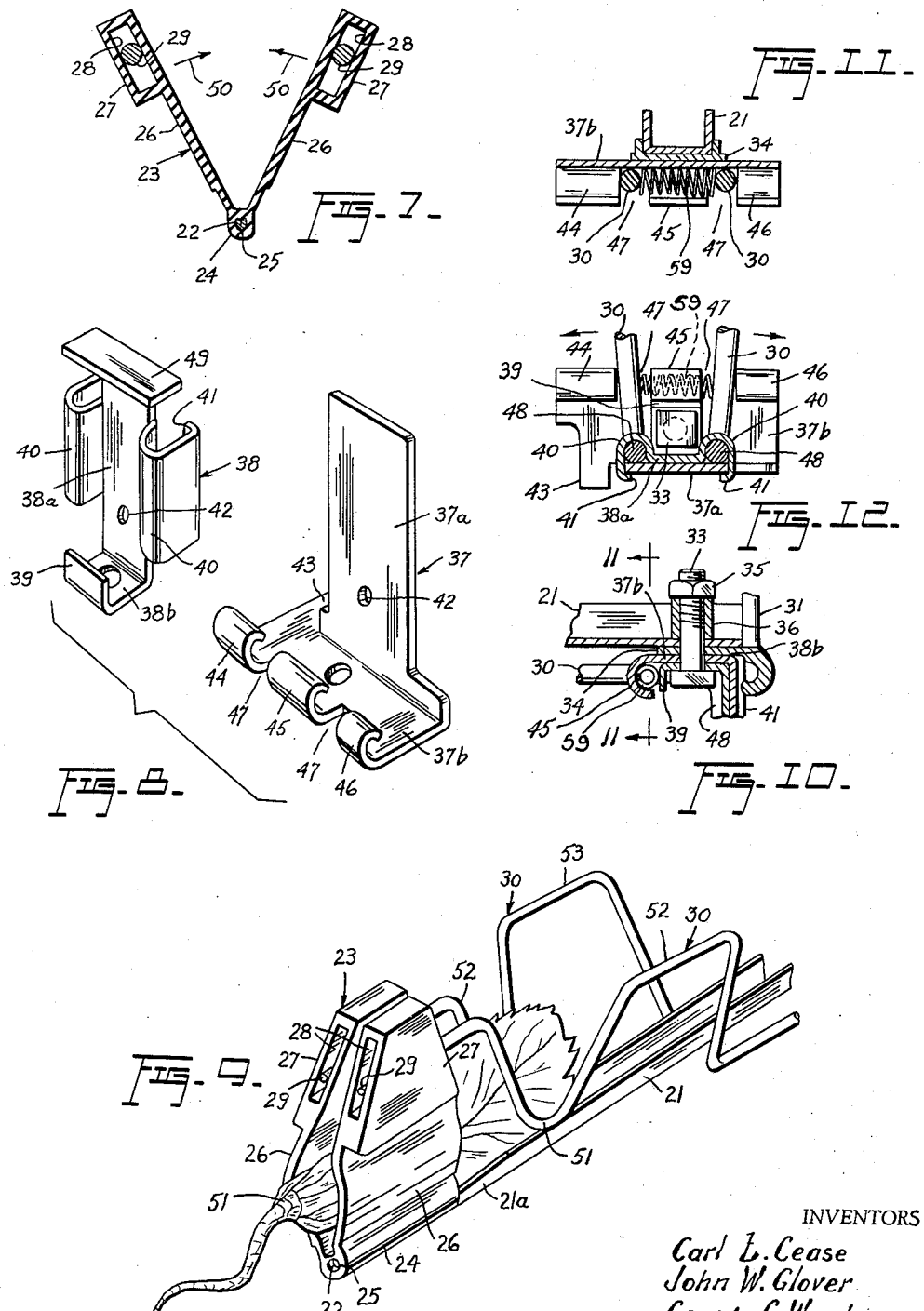

United States Patent Office 2,853,962
Patented Sept. 30, 1958

2,853,962
PLANT HOLDER

Carl B. Cease and John W. Glover, Raleigh, and George C. Wood, Edenton, N. C., assignors to Patent & Development, Inc., Raleigh, N. C., a corporation of North Carolina Application October 31, 1955, Serial No. 543,826

14 Claims. (Cl. 111—2)

This invention relates to new and useful improvements and structural refinements in transplanters, and in particular the invention concerns itself with an improved plant carrier.

The principal object of the invention is to provide a positive acting carrier which is capable of setting plants in a uniformly spaced, natural growing position and which, being equipped with a plant holder of soft, flexible material, is able to conform to the shape of the plant in the manner of wrapping to gently and safely handle the same and protect it against possible damage. In addition, the soft, flexible plant holder effectively safeguards against any possible injury to the hands of the operator placing plants therein.

An important feature of the invention therefore resides in the construction and arrangement of the flexible plant holder, while another important feature lies in the structure of the carrier itself, particularly in the arrangement of the plant holder actuating arms and the attachment of the frame of the carrier to its supporting means. A further important feature of the invention resides in the provision of resilient means for positively opening the plant holder, these resilient means being so arranged as not to come in contact with dirt, such as would impair the operation thereof.

Briefly stated applicants' invention comprises a plant holder for a plant carrier adapted to be supported on the carrier frame, said holder being formed of soft resilient material capable of conforming substantially to the plant and comprising a pair of flexible untensioned movable side portions adapted to yieldingly receive a plant therebetween, closing means, including a pair of actuating arms for moving said holder side portions being provided with sockets to receive portions of said actuating arms, said sockets being of sufficiently greater cross sectional area than the cross sectional areas of those portions of said arms received therein to permit the holder side portions to be moved toward and away from each other without tensioning the side portions of the holder.

Some of the advantages of the invention reside in its simplicity of construction, in its efficient and dependable operation, and in its adaptability to economical manufacture.

The invention will be more readily understood by reference to the accompanying drawings and the following detailed description in which specific embodiments of the invention are set forth as illustrative only of the invention rather than as limiting the same to the specific details set forth therein. In the drawings:

Figure 1 is a side elevational view of the invention;
Figure 2 is a top plan view thereof;
Figure 3 is a sectional view, on an enlarged scale, taken substantially in the plane of the line 3—3 in Figure 2;
Figure 4 is a sectional view, taken substantially in the plane of the line 4—4 in Figure 3;
Figure 5 is a sectional view, taken substantially in the plane of the line 5—5 in Figure 3;
Figure 6 is a sectional view, on an enlarged scale, taken substantially in the plane of the line 6—6 in Figure 2;
Figure 7 is a sectional view, on an enlarged scale, taken substantially in the plane of the line 7—7 in Figure 2;
Figure 8 is a group perspective view of the bracket and plate used in the invention, the same being shown inverted;
Figure 9 is a fragmentary perspective view of the invention in the plant holding position;
Figure 10 is a fragmentary sectional view, similar to that shown in Figure 3, but illustrating a modified form of the invention;
Figure 11 is a sectional view, taken substantially in the plane of the line 11—11 in Figure 10; and
Figure 12 is an underside plan view of the subject shown in Figures 10 and 11.

Referring now to the accompanying drawings in detail, the invention consists of a plant carrier designated generally by the reference numeral 20, which is to be used in a transplanter machine for setting plants in the ground. The machine may be of any suitable conventional construction and, as such, usually includes a driven endless chain means such as a wheel or disc having a plurality of plant carriers provided at spaced points thereon, each carrier including a holder into which a plant is placed and means for closing the holder to sustain the plant therein while it is being carried toward the ground and also means for opening the holder to release the plant therefrom when the plant is set. The means for closing the holder usually take the form of a pair of rails disposed at the opposite sides of the driven means and engageable with a movable portion or portions of the carrier to effect the holder closing action. As already stated, such structure is conventional and well known in the art, such as for example, in the United States Patents Nos. 2,216,923 and 2,003,390.

The plant carrier in accordance with the instant invention comprises an elongated, substantially channel-shaped frame member 21, having a tapered outer end portion 21a terminating in a shaft-like element 22 on which is mounted a plant holder 23.

The holder 23 is formed integrally from soft, resiliently flexible material such as rubber, or the like, the softness and flexibility of the same being such that the holder is capable of conforming substantially to the shape of a plant placed therein in the manner of wrapping and safeguarding it against crushing or other damage. As will be also understood, the soft, flexible material of the holder protects the hands of the operator placing plants therein against possible injury as it leaves no metal exposed at its outer or plant insertion end, therefore encouraging faster feeding.

The base portion 24 of the holder 23 is provided with a bore 25 to frictionally fit the shaft-like portion 22 of the frame member 21, and the holder also includes a pair of divergent, wing-like side portions 26 having thickened upper regions 27 provided with sockets or slots 28 to receive the outer end portions 29 of a pair of actuating arms 30, hereinafter more fully described, by which the holder 23 is opened and closed.

The other or inner end portion of the frame member 21 is adapted to be secured to the driven chain 31, for which purpose it is provided with an aperture 32 having a bolt 33 extending vertically therethrough. It is also adapted to be secured by a bolt (not shown) to a driven disc or wheel for which purpose it is provided with two aligned apertures 32a, one in each of the channel-like side walls of frame member 21. The bolt 33 also passes through an apertured, laterally projecting ear 34 integral with one of the links of the chain 31, it being noted that this ear underlies the inner end portion of the member 21 and is provided with side flanges 34a which supportably engage the sides of the member 21. The bolt 33 is equipped with a nut 35 and a tubular spacer 36 which serves to locate the nut in a plane above the top of the member 21 for purposes of convenient access and turning of the nut by a wrench.

An inverted substantially L-shaped bracket 37 includes a depending vertical portion 37a and a horizontal upper portion 37b, the latter underlying the aforementioned ear 34 and being apertured to receive the bolt 33. A similarly shaped plate 38 is juxtaposed to the bracket 37 and includes a vertical side portion 38a and a top portion 38b in contact with the respective portions 37 and 37b of the bracket. The top portion 38b of the plate 38 is also apertured to receive the bolt 33, it being apparent that the bolt serves to secure all the elements 21, 34, 36, 37 and 38 together.

The top portion 38b of the plate 38 is formed integrally with a downturned lug 39 disposed adjacent the head of the bolt 33 to prevent the latter from turning while the nut 35 is being tightened or loosened, while the marginal edge portions of the plate portion 38a are arcuated to form a pair of spaced, vertical bearings 40 adjacent the bracket portion 37a, whereupon these marginal edge portions are turned inwardly to form keeper elements 41 in slidable engagement with the marginal edges of the bracket portion 37a. This arrangement permits the parts 37, 38 to be easily assembled and assists the bolt 33 in holding the parts together after assembly. If desired, the portions 37a and 38a may also be provided with registering apertures as indicated at 42 to receive a second bolt (not shown) for holding the same together.

The upper portion 37b of the bracket 37 is provided with a projecting element 43 disposed at one side of the chain 31 to assist the ear 34 in preventing displacement of the bracket 37 relative to the chain, and the bracket portion 37b is also formed with a set of downturned, arcuate keeper elements 44, 45, 46 which are transversely aligned and have spaces 47 therebetween providing clearance for the aforementioned arms 30.

The inner end portions 48 of the arms 30 are rotatably mounted in the bearings 40 and their extremities are in supporting engagement with an angulated stop member 49 formed integrally with the lower end of the plate portion 38a. The arms 30 may thus be moved toward and away from each other to respectively close and open the plant holder 23, as indicated by the arrows 50 in Figure 7. The closed position of the holder with a plant 51 therein is illustrated in Figure 9. Portions of the arms 30 adjacent the holder 23 are angulated so as to provide substantially V-shaped guards 52 for protecting the leaves of the plant, while intermediate portions 53 of the arms are angulated and laterally offset to engage the usual rails at the opposite sides of the chain 31 (rails not shown) for closing the plant holder. In other words, as the chain 31 travels and the carrier 20 is brought between the rails, the rails will press the arm portions 53 together or toward each other so that the holder 23 is closed around the plant 51 by the arm portions 29.

When the carrier clears the rails and the plant is to be set in the set in the soil, it is released from the holder 23 by resilient means which automatically urge the arms 30 apart. In the preferred form of the invention such resilient means comprise a spring 54 having a transverse portion 54a seated in notches 55 in the inner end portion of the frame member 21 and terminating in coiled end portions 56 which are wrapped around the arms 30. Intermediate portions of the spring 54 are provided with resiliency imparting coils 57 disposed at the sides of the member 21 and urging the arms 30 apart as shown at 58, to open the plant holder.

In a slightly modified form of the invention shown in Figures 10–12 the resilient means assumes the form of a compression spring 59 disposed in the aforementioned keeper element 45 of the bracket 37 between the arms 30 and engaging the arms with its opposite ends to urge the same apart. In this connection it is to be noted that apart from its function of preventing rotation of the bolt 33, the aforementioned lug 39 is disposed adjacent the element 45 and assists in sustaining the spring 59 in the latter. In any event, the keeper elements 44, 46, being disposed at the outside of the arms 30, provide stop means for limiting the spreading movement of the arms.

The advantage of plant carriers on transplanters has been recognized for many years, namely, eliminating the human error in the location of the plant relative to the location of the water intended for the plant when the water is released mechanically and the plant set by hand as well as the providing of uniform placement of the plant in the soil as opposed to the variations of hand setting in such characteristics as depth to which roots are covered and the angle relative to the vertical position at which the plants are set. Additionally, they permit the operator to ride in a more comfortable position elevated from the dust.

It is the practice in construction of plant carriers to fabricate them from metal and frequently the pocket itself (23 in this instance) is of metal or partially of metal and when resilient material such as rubber is used it has been the general procedure to use it as a coating or covering for that portion of the metal serving as the pocket in which case the rubber is backed up by metal and can therefore give very little and has no tendency to conform to the shape of the plant. This condition has been improved by the use of sponge rubber but the efficiency of this material is decreased in this application because of the contact with dirt and water. Better utilization of rubber is made by stretching it between spaced members but in such cases the rubber has to stretch to give for plant accommodation applying an undesirable pressure on the plant.

With knowledge of the specific construction of the instant invention and the general practices in pocket construction heretofore, it is easy to appreciate the many advantageous features contained in the instant structure in which the metal of the frame element 22 in the pocket construction is within the rubber of the pocket on the plant feed or insertion end as is apparent in Figure 1 protecting the hands of the operator to encourage faster feeding. Further the rubber 24 covering the metal element 22 exposes the rubber to contact the dirt which is desirable as rubber tends to discourage dirt adhesion. The thin soft sidewalls 26 depend on the motion of the arms 30 to open them having no built-in forces acting on the plant as those walls are in no way under tension between members 22 and 29 due to the sockets 28 and the stops 44 and 46. The stops 44 and 46 restrict the lateral motion of arms 30 and the sockets 28 are sufficiently high to permit the plant to bulge the walls 26 to degrees varying with plant sizes reducing the pressure applied as the pocket accommodates the plant in a manner of wrapping rather than binding the plant when the arms 30 cause the pocket to close around a plant.

The frame member 21 being the largest member of the structure is void of wear with the dirt abrasion being taken by the rubber 24 and the arms 30 being pivoted in the vertical bearings 40 of the very small stamping 38 which affords portions 48 of the arms 30 a much larger wearing and supporting surface than would be available on the frame member 21 without materially increasing the width of the metal from which frame 21 would have to be cut therefore materially increasing the scrap.

The stop member 49 supports 48 so that the lower radius of arm 30 cannot bind in bearing 40. The V-shaped portion at 52 of the arms 30 protects the leafy portion of the plant as the plant is conveyed to the ground. The springs 54 or 58 activating arm 30 are remote to the dirt.

The chain links 31 when assembled on the transplanter (not shown) travel around a pair of sprockets, one mounted above the other, and from a generally straight line from the tangent point of the upper sprocket to the tangent point of the lower sprocket. For satisfactory operation for any chain it is necessary that the distance between the center of these sprockets be such as to afford some slack in the chain to which the plant carrier is attached.

As the plant carrier moves from the tangent point of the upper sprocket to the tangent point of the lower sprocket, it assumes a position approximately as shown in Figure 1 in which the frame member 21 tends to be substantially in a horizontal plane. The extent to which member 21 varies from the horizontal is due to the its weight and the force of plant insertion acting downwardly in the area of the holder 23 causing that end to sag. The angle which the frame 21 makes with the horizontal plane due to this sag is in proportion to the slack in the link chain 31, the more the slack the more the sag. The effect of this sag is to tighten the chain by angling the link 31 to which it is attached relative to the vertical chain line between the two sprocket tangent points. For a given amount of slack the shorter the chain link 31 the greater the angle it must make with the vertical to absorb the slack between the two sprocket tangent points with a corresponding angular departure from the horizontal by the frame member 21. To have the chain link 31 excessive in length is impractical as it requires a corresponding increase in sprocket diameter, therefore, the L-shaped bracket 37 is equipped with the depending vertical portion 37a which tends to hold at least 3 of the chain links 31 in a straight line, giving the same effect obtainable by lengthening the chain link 31 with reference to the angle variation from the vertical without a corresponding increase in sprocket size but with a material decrease in the angle frame member 21 makes with the horizontal.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. A plant carrier for transplanters including a driven endless chain, said plant carrier comprising an elongated frame member having a shaft-like outer end portion and adapted at its inner end for attachment to said chain, a plant holder of untensioned flexible material capable of conforming substantially to the shape of a plant placed therein, said holder having its base portion mounted on the shaft-like portion of said frame member and including a pair of flexible divergent side portions adapted to yieldingly receive a plant therebetween, a depending bracket secured to the inner end portion of the frame member, means for actuating the side portions of said holder toward and away from each other comprising a pair of actuating arms disposed at opposite sides of the frame member, said arms having portions operatively connected to the side portions of said plant holder and angulated inner end portions rotatably attached to said bracket, and resilient means urging said arms apart for urging the plant holder to its open position, said holder side portions being provided with sockets to receive portions of said actuating arms, said sockets being of sufficiently greater cross sectional areas than the cross sectional areas of those portions of said actuating arms received therein to permit the holder side portions to be moved toward and away from each other without tensioning the side portions of the holder.

2. The device as defined in claim 1 together with angulated keeper elements provided on said bracket at the outside of said arms for limiting the spreading movement of the arms.

3. The device as defined in claim 1 together with an angulated plate secured to said bracket and providing bearings for the inner end portions of said arms, the angulated portion of said plate underlying the inner ends of the arms and providing an end support therefor.

4. A plant carrier for transplanters having a driven endless chain, comprising an elongated frame member having a shaft-like outer end portion and an inner portion provided with an aperture, a substantially V-shaped plant holder of soft flexible material having its base portion mounted on the shaft-like portion of said frame member and including a pair of divergent side portions adapted to receive a plant therebetween, said side portions of said plant holder being provided with sockets substantially parallel to the axis of said frame member, a bolt extending through said aperture for securing the frame member to said chain, an inverted substantially L-shaped bracket including a depending vertical portion and a horizontal uppper portion secured by said bolt to the inner end portion of the frame member, an angulated plate including a top portion secured by said bolt to the upper portion of said bracket and a side portion juxtaposed to the vertical portion of the bracket, lateral edge portions of the side portion of said plate being arcuated to coact with said bracket in providing a pair of spaced parallel bearings and terminating in inturned edge portions supportably engaging the lateral edges of the vertical portion of the bracket, a pair of arms disposed at opposite sides of said frame member and having outer end portions thereof disposed in said sockets and angulated inner end portions rotatably mounted in said bearings whereby said arms are movable toward and away from each other to respectively close and open said plant holder, and resilient means urging said arms apart for urging the plant holder to its open position.

5. The device as defined in claim 4 together with an angulated stop member provided at the lower end of the side portion of said plate and abutting the inner ends of said arms.

6. The device as defined in claim 4 together with a downturned lug provided on the top portion of said plate and engageable with said bolt to prevent the latter from rotating in said aperture.

7. The device as defined in claim 4 together with downturned keepers provided on the upper portion of said bracket at the outside of said arms for limiting the spreading movement of the arms under the action of said resilient means.

8. The device as defined in claim 4 wherein said resilient means comprise a spring carried by said frame member and having end portions thereof connected to said arms.

9. The device as defined in claim 4 wherein said resilient means comprise a coil spring carried by the upper portion of said bracket and having its ends in engagement with said arms.

10. A plant carrier for transplanters including a driven endless chain, said plant carrier comprising an elongated frame member having a shaft-like outer end portion and adapted at its inner end for attachment to said chain, a plant holder of untensioned flexible material capable of conforming substantially to the shape of a plant placed therein having its base portion mounted on the shaft-like portion of said frame member and including a pair of divergent side portions adapted to yieldingly receive a plant therebetween, a depending bracket secured to the inner end portion of the frame member, means for actuating the side portions of said holder toward and away from each other, comprising a pair of actuating arms disposed at opposite sides of the frame member, said arms having outer end portions operatively connected to the side portions of said plant holder and angulated inner end portions rotatably attached to said bracket whereby said arms are movable toward and away from each other for respectively closing and opening said plant holder, the side portions of said plant holder being provided with sockets having the outer end portions of said arms disposed therein, and resilient means urging said arms apart for urging the plant holder to its open position, said holder side portions being provided with sockets to receive portions of said actuating arms, said sockets being of sufficiently greater cross sectional areas than the cross sectional areas of those portions of said actuating arms received therein to permit the holder side portions to be moved toward and away from each other without tensioning the side portions of the holder.

11. In a plant carrier for transplanters, the combination of an elongated frame member, a plant holder mounted at one end of said frame member, said holder being formed from soft flexible untensioned material capable of conforming substantially to the shape of a plant placed therein and including a pair of freely movable flexible side portions adapted to yieldingly receive a plant therebetween, the side portions of said holder being provided with sockets substantially parallel to the axis of said frame member, and means for actuating the side portions of said holder toward and away from each other comprising a pair of movable arms disposed at opposite sides of the frame member and having portions thereof operatively engaged in said sockets, said holder side portions being provided with sockets to receive portions of said actuating arms, said sockets being of sufficiently greater cross sectional areas than the cross sectional areas of those portions of said actuating arms received therein to permit the holder side portions to be moved toward and away from each other without tensioning the side portions of the holder.

12. A plant holder for a plant carrier adapted to be supported on the carrier frame, said holder being formed of soft resilient material capable of conforming substantially to the plant and comprising a pair of flexible untensioned movable side portions adapted to yieldingly receive a plant therebetween, closing means, including a pair of actuating arms, for moving said holder side portions toward and from each other, said holder side portions being provided with sockets to receive portions of said actuating arms, said sockets being of sufficiently greater cross sectional area than the cross sectional areas of those portions of said arms received therein to permit the holder side portions to be moved toward and away from each other without tensioning the side portions of the holder.

13. A plant holder for plant carriers, said holder being formed integrally from soft flexible untensioned material capable of conforming substantially to the shape of a plant placed therein and comprising a body including a base portion adapted to be mounted on a carrier frame and a pair of side portions movable toward and away from each other to receive a plant therebetween, said side portions having thickened outer regions provided with sockets for reception of actuating arms for opening and closing said holder, said sockets being of sufficiently greater cross-sectional areas than the cross-sectional areas of those portions of said actuating arms received therein to permit the holder side portions to be moved toward and away from each other without tensioning the side portions of the holder.

14. A plant carrier for transplanters, the combination of an elongated frame member, a plant holder of soft resilient flexible material capable of conforming substantially to the shape of a plant placed therein supported by said frame member and including a pair of untensioned movable side portions adapted to receive a plant therebetween, and closing means comprising actuating arms for moving said side portions of said holder towards each other to secure a plant therebetween in a manner of wrapping, said holder side portion being provided with sockets to receive portions of said actuating arms, said sockets being of sufficiently greater cross sectional areas than the cross sectional areas of those portions of said actuating arms received therein to permit the holder side portions to be moved toward and away from each other without tensioning the side portions of the holder.

References Cited in the file of this patent

UNITED STATES PATENTS

| | | |
|---|---|---|
| 653,298 | King | July 10, 1900 |
| 1,448,661 | Hallingstad | Mar. 13, 1923 |
| 1,645,600 | Kohler | Oct. 18, 1927 |
| 1,765,469 | Vollink | June 24, 1930 |
| 2,216,923 | Poll | Oct. 8, 1940 |
| 2,651,405 | McGowan | Sept. 8, 1953 |
| 2,739,548 | Poll | Mar. 27, 1956 |